United States Patent Office 3,198,245
Patented Aug. 3, 1965

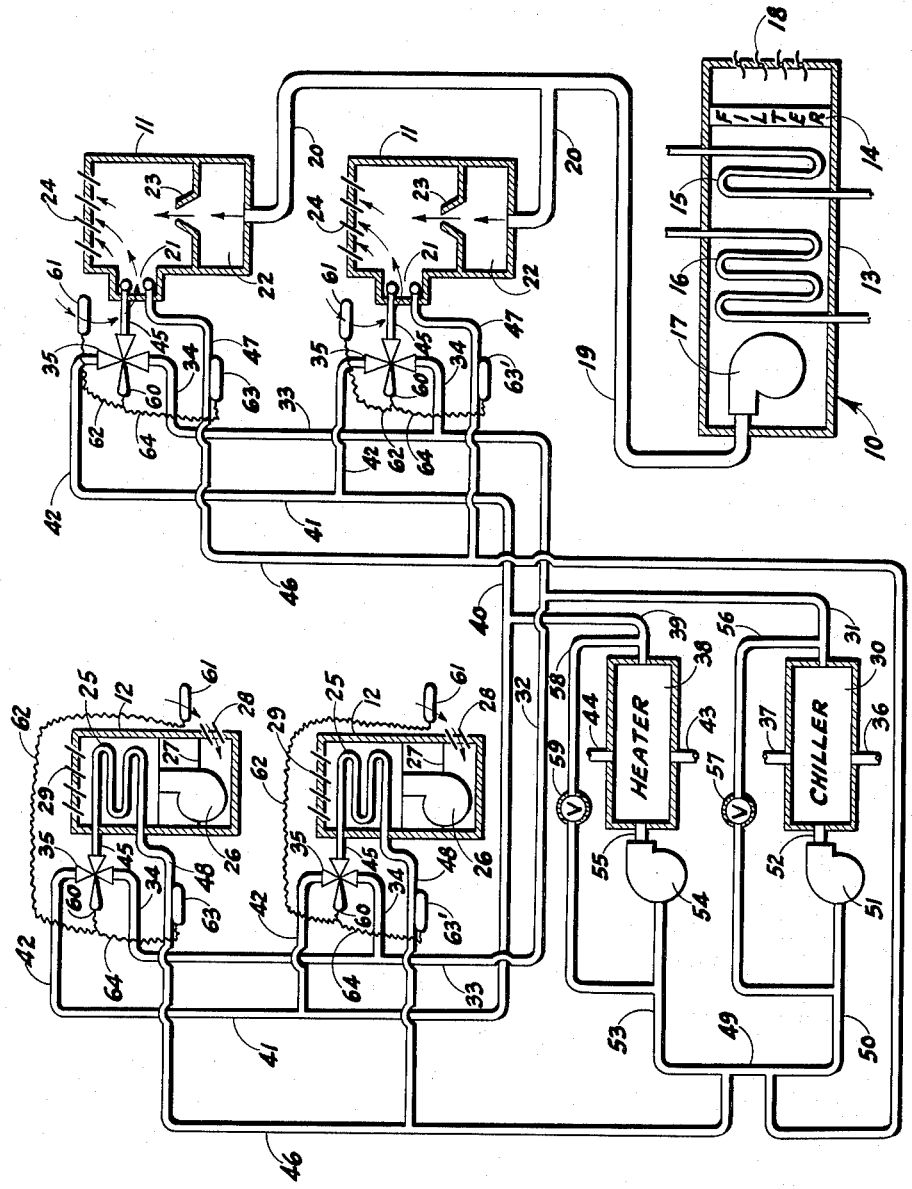

3,198,245
AIR CONDITIONING SYSTEMS
Sam P. Soling, Spring Garden Township, York County, Pa., assignor to Borg-Warner Corporation, Chicago, Ill., a corporation of Illinois
Filed Dec. 5, 1960, Ser. No. 73,855
2 Claims. (Cl. 165—22)

This invention relates to improvements in air conditioning systems and, more particularly, to improvements in the type of air conditioning system as set out in the application of Robert D. Blum, Serial No. 710,751, filed January 23, 1958, now Patent No. 3,024,008 granted March 6, 1962 assigned to the assignee of this invention.

In a system as set out in the Blum application, various rooms within a building to be conditioned are provided with room conditioning units. These units are simultaneously supplied with both heated and chilled water (heat-exchange fluid) for flow through the unit, depending on whether it is desired to heat or cool the particular room. The heated or chilled water returning from the room units all mix in a common return line. Part of the mix is routed to a water chiller and part to a water heater.

This invention specifically relates to a method of insuring that a flow of water through a "defective" room unit is limited to a quantity that will not penalize the over-all operating efficiencies of the system. By the "defective" unit is meant one that is incapable of heating or cooling a particular room, regardless of the water flow rate through the unit coil. For example, a room unit of the fan coil type with the fan shut off will not produce much heating or cooling capacity regardless of how much heated or chilled water goes through the coil. In a room unit of the induction type, that is the type wherein a primary flow of high pressure air induces a secondary flow of room air through the unit, when the primary air is shut off, the result is no secondary air velocity across the coil. Again, there will be very little heating or cooling capacity, regardless of how much heated or chilled water goes through the coil.

In both the above instances, the thermostatic control would call for full flow of either heated or chilled water without materially affecting room conditions and without beginning to satisfy the room thermostat. Such a unit represents a short circuit or a direct bypass from the heated water supply line or the chilled water supply line into the common return. As set out above, this can very seriously penalize the over-all operating performance. With the type of air conditioning system as disclosed herein, an increased flow of water through a room unit can penalize over-all operating costs by mixing excess of water quantities in a common return. It will be appreciated that when most of the room units in the system are primarily cooling, a tremendous inflow of heated water through a defective unit into the common return can very materially increase the temperature of the returned water. This increase in temperature of the returned water has a marked effect on the operating efficiency of the system. It is a penalty which the system need not bear when the herein-disclosed invention is utilized.

The converse is also true; that is, when the units of the system are primarily heating an inflow of chilled water through a defective unit, that is on the cooling cycle, into the common return will have an adverse effect on the efficiency of the system by pulling the temperature of the returned water below its normal temperature.

The situation is more critical when it is heated water that is bypassed by a defective unit into a common return rather than when it is chilled water. This is for several reasons. The primary reason is that the temperature differential between the heated water and the returned water will normally be far greater than that between the chilled water and the returned water. Because of this, the same amount of heated water will have a more marked effect on the temperature of the returned water than will chilled water. A second reason that the heated water situation is more critical is because when chilled water is short circuited through a defective unit into the common return, thereby lowering the temperature, it is generally only necessary to utilize more steam in the heat generating unit in order to reheat this water. However, in the reverse situation, additional refrigeration is required to chill down the heated water short circuited into the return, which is a far more costly process.

A principal object of the invention, therefore, is to provide, in an air conditioning system of the type wherein both heated and chilled water are simultaneously supplied to a room unit, means for holding the flow of heated water to minimum quantities through a room unit in which conditions are such that full flow through the unit of such heated water cannot satisfy thermostatic requirements, herein termed a "defective" unit.

Another object of the invention is to provide, in a system of the type wherein both heated and chilled water are simultaneously supplied to a room unit, means for holding the flow of either heated or chilled water through a "defective" room unit to minimum quantities. Yet another object of the invention is to provide, in a system of the type just above-mentioned, means for limiting the flow of either heated or chilled water through a room unit coil when the differential between the room air temperature and the return water temperature at the unit coil exceeds a preselected minimum.

The invention consists of the novel constructions, arrangements and devices to be hereinafter described and claimed for carrying out the above-stated objects and such other objects as will appear from the following description of a preferred embodiment of the invention described with reference to the accompanying drawing, in which:

The single figure is a schematic representation of the herein disclosed air conditioning system.

Turning now to the figure, a building to be conditioned is provided with a primary air conditioner 10 and a plurality of room units, which may take the form of so-called "induction" units 11 or "fan coil" units 12, with a unit 11 or 12 being in air communication with each space to be conditioned. The choice of a unit 11 or 12 will depend on varying circumstances, which need not be elaborated on here; suffice it to say that the invention is applicable to either.

Primary air conditioner 10 comprises a casing 13, in which is located a filter 14, a pre-heater 15, a dehumidifier coil 16, and a fan 17 of any conventional type. Fan 17 is generally of a constant speed type and of sufficient capacity to provide for the necessary air velocity at a unit 11 to provide a desired induction effect on the room air when the primary supply air is discharged within the unit. Air inlet louvers 18 are provided in the casing 13 for controlling the flow of outside air therethrough. A discharge conduit 19 and branch conduits 20 are provided for connecting the fan 17 with the various units 11. It will be appreciated that primary air conditioner 10 is generally utilized only in those buildings using induction units 11.

Each induction unit 11 contains a heat-exchange coil 21, a plenum chamber 22, an air discharge nozzle 23, and also an air outlet 24, from which the air is discharged into the room to be conditioned.

Fan coil units 12 comprise a heat-exchange coil 25 and a fan 26, supported by any suitable means such as a baffle 27. Air from the room to be conditioned is drawn into the unit 12 by way of inlet openings 28, and is discharged therefrom by way of discharge openings 29.

A chilled water circuit and a heated water circuit are provided for simultaneously supplying chilled and heated water to the units 11 and 12. Chilled water circuit includes a chiller 30 connected by way of a discharge line 31 to a chilled water supply header 32. A plurality of take-off risers 33 lead from header 32 to the various parts of the building that need conditioning. Lines 34 lead from risers 33 to the cold water inlet of a unit water control valve 35. A supply line 36 and a discharge line 37 are provided in chiller 30 for circulating any desired fluid through the chiller to properly chill the water flowing therethrough. Means such as a throttling valve (not shown) are generally provided in supply line 36 for regulating the flow of liquid through the chiller.

The heated water circuit comprises a heater 38, connected by way of a discharge line 39 to a heated water supply header 40. A plurality of heated water risers 41 lead from header 40. Take-off lines 42 lead from risers 41 to the heated water inlet of valves 35. A supply line 43 and a discharge line 44 are provided in heater 38 for circulating any desired fluid through the heater to heat the water flowing therethrough. Supply line 43 generally has means, such as a throttling valve (not shown) therein for controlling the supply of heated fluid supplied heater 38.

From valve 35, a discharge line 45 leads to coils 21 or 25, as the case may be. Mixed water return lines 46 are provided, and are connected to the outlet of coils 21 by way of lines 47 and to the outlet of coils 25 by lines 48. Return lines 46 lead to a common return water header 49. From header 49 a line 50 leads to the inlet of a chilled water pump 51. The outlet of pump 51 is connected by way of a line 52 to chiller 30. Similarly, a line 53 leads from header 49 to the inlet of a heated water pump 54. A line 55 connects the discharge of pump 54 to heater 38. It will be appreciated that instead of two pumps in parallel, a single pump could be utilized, discharging into a common header which would then lead to both chiller 30 and heater 38. A bypass line 56 leads from discharge line 31 back to the inlet of chilled water pump 51, and contains therein a one-way pressure relief valve 57. A similar bypass 58 leads from discharge line 39 back to the inlet of heated water pump 54, and contains therein a one-way pressure relief valve 59.

Thermostatic control means are provided for each unit 11 or 12 to control each valve 35 to thereby supply either heated or chilled water to a particular coil, depending on the temperature then obtaining in the particular room. Such control means take the form of a valve controller 60 attached to each valve 35. Thermostatic control bulbs 61 are provided each controller 60, and are connected thereto by way of the usual capillaries 62. In addition each controller 60 is provided with thermostatic control bulbs 63, or alternately 63', which are connected thereto by way of the usual capillaries 64 respectively. Thermostatic control bulbs 61 are located in the return air stream while thermostatic control bulbs 63 and 63' are located or either lines 47 or 48.

*Operation*

During the greater part of the year, the outside temperature is such that some rooms will require cooling (sunlit rooms, for example), while other will require heating (shaded rooms, for example).

For those rooms requiring cooling, water chilled in chiller 30 flows by way of discharge line 31 to header 32. Chilled water exits header 32 by way of risers 33 and thence flows by way of lines 34 to valves 35. Thermostatic bulbs 61 act on controller 60 to position valves 35 in such a manner that no heated water flow is permitted and chilled water only is allowed to pass through coils 21 and 25. Valves 35 are modulating, dependent on the amount of cooling required in a particular room. Thermostatic control bulbs 63 are sized and selected such that they have no influence on controller 60, so long as the temperature of the water flowing through line 48 is no greater than a preselected minimum such as, for example, 85°. They, therefore, will not be effective on the cooling cycle of any unit.

For those rooms requiring heating, water heated in heater 38 flows by way of line 39 to heated water header 40, whence the water flows into risers 41 and lines 42 to the heated water inlet of valves 35. Thermostatic bulbs 61 act on controller 60 to position valves 35 in such a manner that no chilled water flow is permitted and heated water only is allowed to pass through coils 21 and 25. Valves 35 again are modulating, dependent on the amount of heating requirement in any particular room.

Should there be a "defective" unit, such as, for example, a fan coil unit in which the fan is not operating or an induction unit in which there is no flow of primary air, then no heat will be removed from the water flowing through coils 21 and 25. Therefore, the heated water is, in effect, directly bypassed between a heated water supply line and a return line to therein mix with return water to the detriment of the entire system. Thermostatic bulb 63 then acts to maintain a temperature of 85° of the heated water in line 48. Since only a very small amount of heat is removed from the heated water flowing through the unit coil, the result is an inconsequential amount of heated water flowing directly into the return water header, which has a negligible effect on the over-all capacity of the system.

Returned water flows through lines 47 and 48 respectively into the common return lines 46 and thence into return header 49. From header 49, the return water flows through either line 50 or line 53 to the inlet of pumps 51 and 54 respectively, whence it flows through lines 52 or 55 respectively back to the chiller 30 and water heater 38.

In those rooms served by fan coil units 12, room air enters the units by way of inlet openings 28 under the influence of fans 26. The room air then flows over coils 25, giving up its heat to the chilled water flow within the coils or picking heat from the heated water flowing therethrough. The room air then exits the unit by way of discharge openings 29 for return to the room.

With respect to the induction units 11, outside air is drawn into primary air conditioner 10, purified by filter 14, and dehumidified in passing over coil 16. Coil 16 is supplied with a chilled heat-exchange fluid derived from any suitable source. The primary air is then delivered under the influence of fan 17 to the various induction units by way of conduit 19 and branch conduits 20. The primary air then flows through nozzles 23 and, in so doing, induces a flow of room air through coils 21. The room air gives up its heat to the chilled water flowing through coils 21, or picks up heat from the heated water flow and then mixes with the incoming primary air for return to the room by way of outlets 24.

Even though the greater problem is that of heated water being short circuited through a "defective" unit into a common return, it may be desirable, in some instances, to provide against the short circuiting of chilled water through a "defective" unit. For this purpose, thermostatic control bulbs 63' may be utilized, as seen in the drawing. Thermostatic control bulbs 63' are sized and selected such that they have no influence on controller 60, so long as the temperature differential between the water flowing through line 48 and the return air flow, as evidenced by bulb 61, is less than a preselected minimum, such as, for example, 18°. Generally speaking, when the units are operating properly, the temperature differential between the return air flow and the return water flowing through line 48 is on the order of 10°. Should there be a "defective" unit, then no heat will be added to the chilled water from air flowing over coils 21 and 25, and the temperature difference between the chilled water temperature flowing through line 48 and the return air will be such that bulb 63 will act on controller 60 to throttle valve 35 to a point where the 18° differential will be maintained. This results in but a minimal flow of chilled water directly into the return water header, which has a negligible effect on the over-all capacity of the system.

As in those rooms requiring cooling, should there be a "defective" unit wherein heated water is, in effect, directly bypassed between a heated water supply line and a return line to therein mix with return water to the detriment of the entire system, then thermostatic bulb 63' acts to maintain the 18° temperature differential between the heated water in line 48 and the return air flow.

It will be apparent, therefore, that means are provided for insuring that there can be no direct bypass in effect between a heated water supply line and the return water header, to the detriment of the operating efficiency of the system. Where desirable, means may be provided for insuring that there can be no direct bypass in effect between a chilled or heated water supply line and the return water header. Should there be a "defective" unit, as herein defined, then thermostatic control bulbs 63 or 63' act in concert with bulb 61 to affect valve controller 60 to maintain either an absolute temperature of the heated water passing through the coil, or a predetermined temperature difference between either the heated or chilled water and the return air flow.

As used herein, the term "water" means any suitable heat-exchange liquid or brine, which may be used effectively as a heat-exchange medium.

I wish it to be understood that my invention is not to be limited to the specific constructions and arrangements shown and described, except only insofar as the claims may be so limited, as it will be apparent to those skilled in the art that changes may be made without departing from the principles of the invention.

What is claimed is:

1. An air conditioning system for multi-room buildings comprising a plurality of heat-exchange coils in air communication with respective rooms; means including a heater and a chiller for simultaneously supplying a heated and a chilled heat-exchange fluid to said coils for flow therethrough; means for flowing room air over said coils in heat-exchange relation therewith; valve means located at the inlet to each said coil; control means for positioning said valve means to flow either heated or chilled heat-exchange fluid through said coils, dependent on whether the room temperature is below or above a predetermined temperature; and means for overriding said control means to maintain a predetermined maximum leaving temperature of said supplied heated fluid exiting a coil.

2. An air conditioning system for multi-room buildings comprising a plurality of heat-exchange coils in air communication with respective rooms; means including a heater and a chiller for simultaneously supplying a heated and a chilled heat-exchange fluid to said coils for individual flow therethrough; means for flowing room air over said coils in heat-exchange relation therewith; valve means located at the inlet to each said coil; control means for positioning said valve means to flow either heated or chilled heat-exchange fluid to said coils, dependent on whether the room temperature is below or above a predetermined selected temperature; and means for overriding said control means to maintain a predetermined temperature differential between the temperature of heat-exchange fluid exiting said coils and said selected room temperature.

References Cited by the Examiner

UNITED STATES PATENTS

| | | | |
|---|---|---|---|
| 2,196,012 | 4/40 | Gilbert | 165—39 |
| 2,344,555 | 3/44 | McGrath | 165—22 X |
| 2,363,294 | 11/44 | Carrier | 165—55 X |
| 2,511,677 | 6/50 | Spofford | 236—1 |
| 2,796,740 | 6/57 | McFarlan | 165—29 |
| 2,930,593 | 3/60 | Blum | 165—50 X |
| 3,024,008 | 3/62 | Blum | 165—22 |
| 3,032,324 | 5/62 | Fiala | 165—39 |

CHARLES SUKALO, *Primary Examiner.*

HERBERT L. MARTIN, FREDERICK L. MATTESON, Jr., *Examiners.*